May 2, 1967 H. KUMMERMAN 3,317,058
TRAVELLING CRANE WITH TELESCOPING BOOM ASSEMBLY
Filed Dec. 18, 1964 6 Sheets-Sheet 1

INVENTOR HENRI KUMMERMAN

ATTORNEYS Kenyon & Kenyon

United States Patent Office 3,317,058
Patented May 2, 1967

3,317,058
TRAVELLING CRANE WITH TELESCOPING
BOOM ASSEMBLY
Henri Kummerman, Paris, France, assignor to MacGregor-Comarain, Paris, France, a body corporate of France
Filed Dec. 18, 1964, Ser. No. 419,351
Claims priority, application France, Dec. 19, 1963,
957,834; Oct. 2, 1964, 990,241
6 Claims. (Cl. 212—74)

The present invention relates essentially to a loading and unloading appliance on vehicles and stationary plants and more patricularly on ships of the gantry type, with telescopic girder and hoisting trolley movable along the gantry and the telescopic girder, and supported by external continuous overhead runways extending throughout the useful length of the weather deck of the ship, or in any other manner. The invention represents improvements for use with travelling cranes of the rolling bridge or rolling gantry type described and shown in applicant's at-one-time co-pending application, Ser. No. 299,963, filed August 5, 1963 (now U.S. Patent No. 3,220,571, granted November 30,1965).

It is the essential object of the present invention to create on the one hand a rope-type device for controlling the translation of said telescopic girder and said trolley, as well as the hoisting means, the power winches of these devices being carried by the main frame structure of each gantry, and on the other hand a shelter for receiving the aforesaid gantries.

The device according to the present invention is characterized in that it comprises a combination rope system for controlling the movements of translation of said telescopic girder and said hoisting trolley, which includes at least two winding drums mounted in a fixed position on the main frame structure of each gantry, said drums being substantially parallel and adapted to be disconnected separately from the drive with means for the selective co-ordinate control of the reversible driving and driven movements, said drums revolving in opposite directions, being adapted mutually and respectively to wind the end of at least one traction driving rope and to simultaneously and synchronously unwind its opposite end, said rope being attached to said trolley and forming a loop passing over at least four sheaves or the like disposed respectively by pairs adjacent to each end of said main frame structure and said telescopic girder, the latter comprising means for attaching said rope thereto.

According to another feature characterizing this invention, the ship's superstructure or castle comprise a compartment for sheltering the aforesaid gantries when the vessel is out at sea, said compartment consisting preferably of a 'tweendeck space provided in said castle and opening at least one of its longitudinal ends towards the weather deck of the ship and being equipped with inner runways for said gantries, said runways being substantially in direct and contiguous alignment with the external longitudinal service runways.

Other features and advantages of this invention will appear as the following description proceeds with reference to the accompanying drawings showing diagrammatically various forms of embodiment thereof:

FIGS. 5a and 5b are perspective views illustrating more in detail the diagrammatically shown components of FIG. 1 to 5, including the travelling crane, main frame, telescopic girder and hoisting trolley and associated details in different positions of operation by the combined rope control means;

FIG. 5c is a perspective view illustrating details of rope clamping means shown diagrammatically in FIG. 5a;

Figure 3:
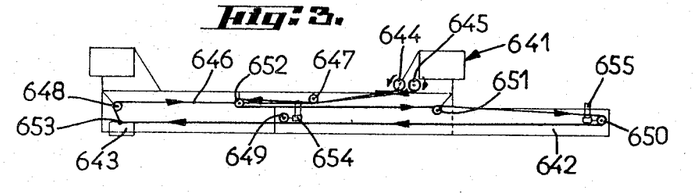
FIGURE 3 is a similar diagram showing the telescopic girder locked in its outermost position, with the trolley ready to be moved.
Figure 4:
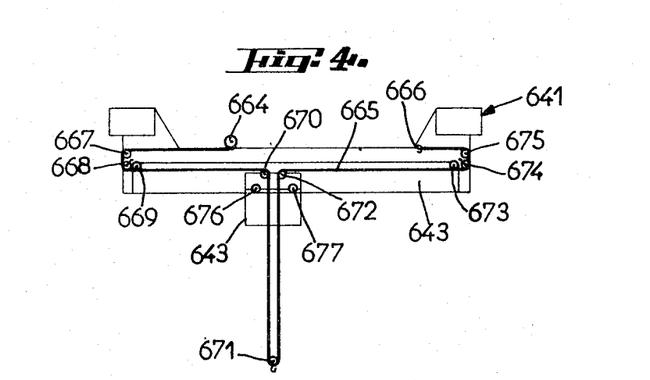
FIGURE 4 shows the mode of operation or reeving arrangement of the hoisting control system in the retracted position of the telescopic girder.
Figure 5:
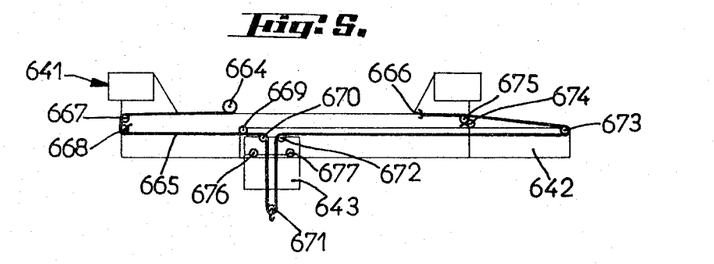
FIGURE 5 is a view similar to FIGURE 4 with the telescopic girder in its overhanging or outboard position.
Figures 5A, 5C:
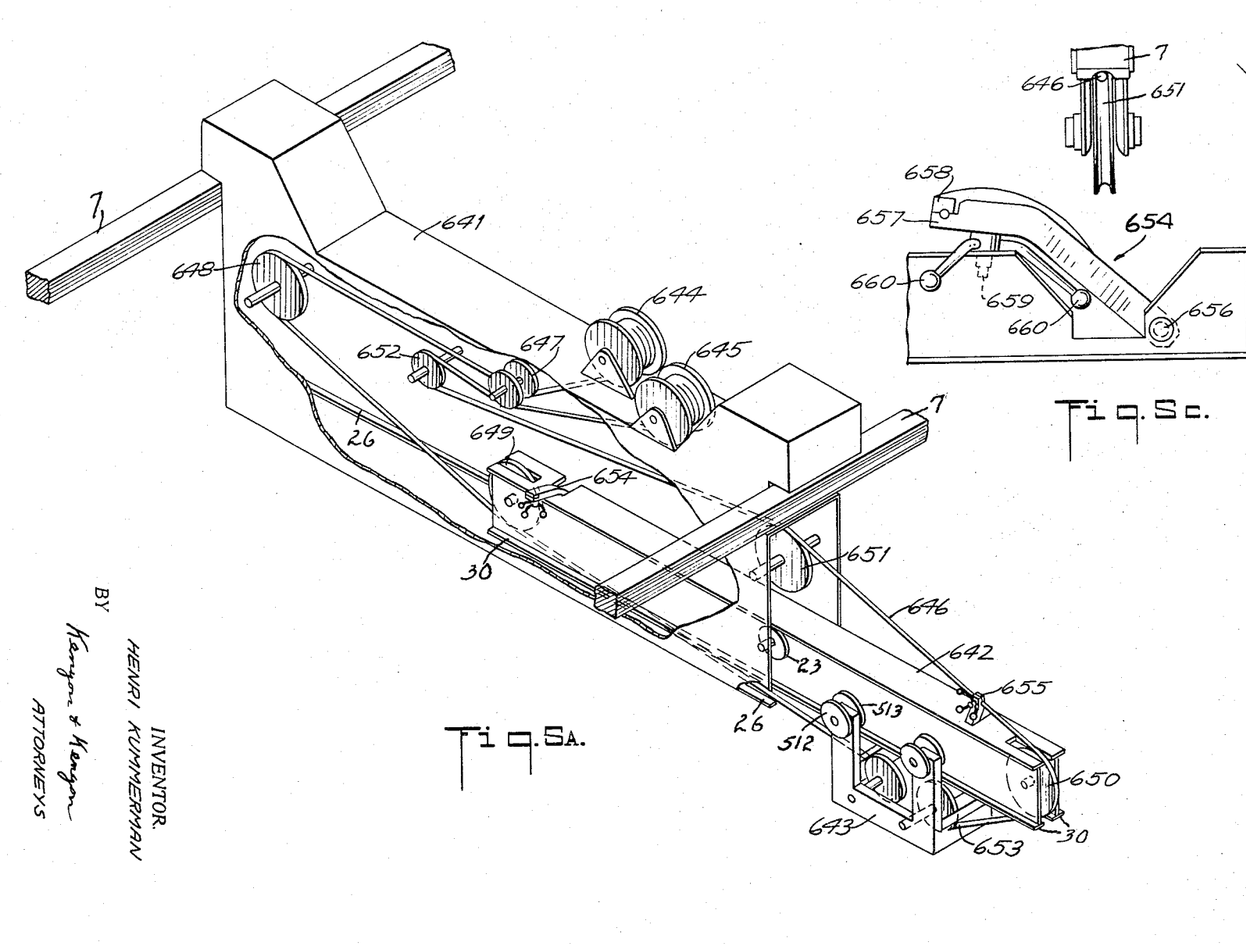
Figure 5B:
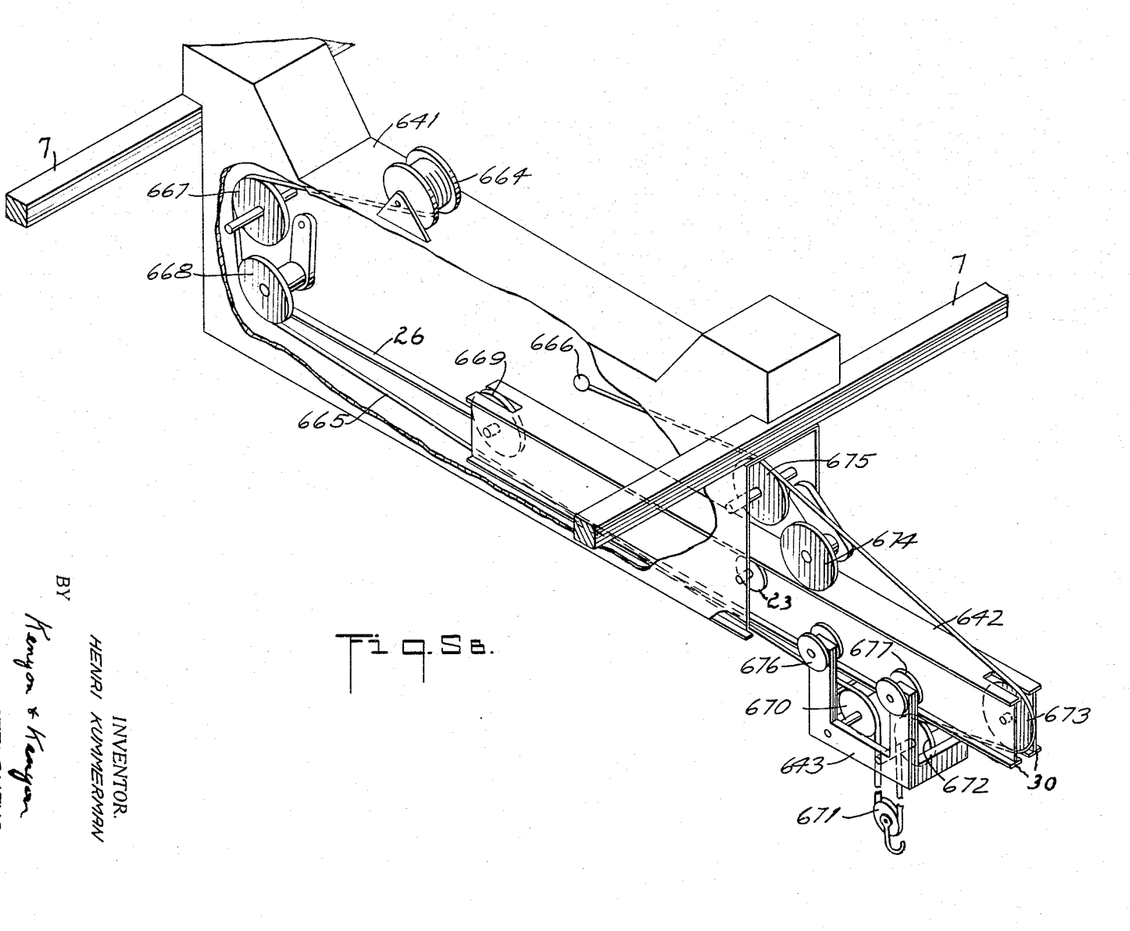

Referring to the drawings and first to FIGURES 5a and 5b, in conjunction with FIGURES 1 to 5, the crane to which this invention is applicable comprises a power driven travelling crane of the type described in said Patent No. 3,220,571 supported by and movable along a pair of parallel, horizontal elevated runways 7. The crane comprises a main frame 641 which may be either a rolling bridge or rolling gantry. The main frame 641 may have, for example, in cross-section the shape of an open-ended inverted channnel, the vertical sides of which each have one of their lower edges provided with a horizontal inwardly turned flange 26 disposed in parallel relationship and on a level with each other and extending the full length of said main frame. The vertical sides of said channel carry on their inner faces spaced roller means 23 horizontally aligned along the length thereof for slidably supporting sidewise and guiding a telescoping boom 642 of substantially the same length as said main frame 641, being accommodated within the latter between the vértical sides thereof, whereby said boom is reciprocally shiftable endwise from a retracted position inside of said main frame to an overhanging extended position wherein it is projectable outwards at least in part from either end of said main frame. This telescoping boom 642 is provided at its bottom portion with a pair of substantially parallel, horizontal outwardly turned flanges 30 on a level with each other, extending the full length of said boom 642 and registering respectively in spaced relationship with said inwardly turned flanges 26 of said main frame. The upper faces of these flanges 26 and 30 form roller-tracks. The rolling crab, carriage or trolley 643 is provided with at least two pairs of wheels, each pair comprising an outer wheel 512 for riding on one flange 26 of said main frame 641 and an inner wheel 513 for riding on one flange 30 of said telescoping boom 642, whereby said crab or trolley 643 is suspended from said crane and movable in a continuous manner along the full length of both said frame and said boom from the free extreme overhanging projecting end of said boom in its outwardly extended position to the opposite remote extreme end of said main frame. Thus, the crab or trolley 643 may be indifferently supported either from said main frame or said boom or both. For example, when the crab or trolley moves along the outwardly projecting or overhanging portion of the boom, the crab or trolley is only supported, through its inner wheels 513 by the boom, whereas when the crab moves along the inner portion of the boom which has remained located inside the main frame, the crab or trolley is supported by its inner and outer wheels 513, 512 and when the crab or trolley moves along that portion of the main frame which extends between the inner end of the boom and that opposite end of the main frame which is most remote from the outer end of said boom, the crab or trolley is supported by its outer wheels only entirely by the main frame.

The structure of the rope clamping member 654 shown diagrammatically in FIG. 5a is similar, for example, to that of French application NPV 957,834, filed December 19, 1963, the right of priority of which is claimed in the present application, being shown clearly in FIGURE 22 of said French application, a certified copy of which is of record herein. The releasable clamping member 654 is adapted to grip the cable 646 or to be moved clear of the latter. FIGURE 5a shows it in clamping engagement and FIGURE 5c shows it on an enlarged scale in a disengaged position relative to cable 646. The operation of clamping member 654 is similar to that of a dog, pliers, nippers, clipping tongs, a chuck or a vise. Clamping member 654 is pivotally mounted on a horizontal shaft 656 parallel to the longitudinal axes of cable 646 and of telescoping boom 642 so that said clamping member is swingable about said shaft 656 in a cross-wise direction with respect to cable 646. Clamping member 654 comprises a pair of jaws 657, 658 at least one of which 658 is pivotally supported so as to be movable relative to the other jaw 657. Each clamping member, such at 654 is provided preferably with manual operating means for effecting cable gripping and releasing movement of its jaws and such manual operating means, for example, comprises a clamping screw 659 threadable into a nut rotatably secured to jaw 658 and operable by a handwheel 660 or similar handle or crank. Clamping member 655 shown only in FIGURE 5a is of identical construction with clamping member 654.

Referring further to the drawings, and in conjunction with FIGURES 5a and 5b, FIGURES 1 to 3 inclusive illustrate the principle of operation of the various steps or operations of a combination rope-type system for controlling the respective movements of translation of the telescopic girder end of the hoisting trolley according to a specific form of embodiment of this invention. The reference numeral 641 designates in general the main frame structure of the gantry carrying the telescopic girder 642. The gantry runways with their posts have been omitted from FIGURES 1 to 5 to avoid unduly complicating the drawing. The hoisting trolley 643 carrying the load hook is adapted to move in either direction throughout the length of the telescopic girder 642 and main frame structure 641 irrespective of the relative position of the telescopic girder with respect to the main frame structure.

The aforesaid combination control system permitting of producing indifferently and separately the movement of translation either of the telescopic girder or of the hoisting trolley comprises at least two winding drums 644, 645 mounted in a fixed position on the main frame structure 641 of each gantry. These two drums are preferably similar and have substantially horizontal and parallel axes. The winding surface of each drum is formed preferably with a substantially helical continuous groove adapted to receive a common traction rope 646 for actuating the telescopic girder or the hoisting trolley. Both drums are advantageously an integral part of a single winch providing two winding directions, equipped with an electric driving motor, a reduction gearing and a braking harness associated with each drum. Each drum is adapted to be disconnected separately from the drive, that is, from the power shaft of the winch which comprises a selective control mechanism adapted to reverse in a co-ordinate manner the driving and driven movements of each drum, these drums being normally adapted to revolve in opposite directions and to mutually wind the end of the driving or traction rope 646 and to simultaneously and synchronously unwind the opposite end of said rope. The aforesaid winch comprises a control member or lever having at least three positions for connecting said drums to the drive either simultaneously or separately while disconnecting the other drum and operating simultaneously the brake harness of the disconnected drum, the aforesaid brake harness being adapted to exert a tangential effort during the nearly free unwinding rotation of this drum. The aforesaid winch control arrangement may be operated either manually or through remote control means.

The traction rope 646 extending for example from drum 644 passes successively over a guide sheave 647 carried by the main frame structure 641 of the gantry, over a return sheave 648 also carried by the main frame structure 641 and located adjacent one end of said frame structure, over another return sheave 649 carried by the corresponding or adjacent end of the telescopic girder 642, over a return sheave 650 carried by the opposite end of said telescopic girder, over a return sheave 651 carried by the opposite end of said main frame structure 641, over another guide sheave 652 carried by the main frame structure 641, for example in the central portion thereof, and is finally wound with its other end on the other drum 645 to complete a kind of loop.

The hoisting trolley 643 is attached permanently to the rope 646 at least one point 653 thereof, so as to be driven by this rope during any movement thereof.

The telescopic girder 642 comprises fastening means adapted to permit the invariable coupling or uncoupling of the telescopic girder 642 with respect to the rope 646.

These fastening means consist of at least one or preferably two clamping or like means 654, 655, disposed preferably each at one end of the telescopic girder and comprising each a pair of relatively movable claws or like members.

Figure 1:
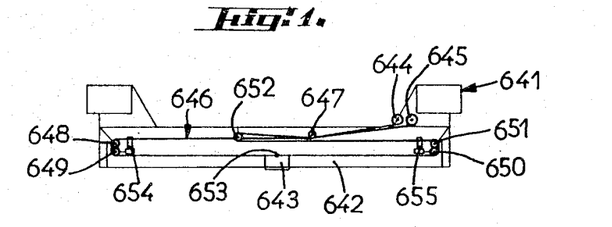
FIGURE 1 illustrates the reeving arrangement of the combined rope control means for operating the telescopic girder and hoisting trolley in the retracted condition of the telescopic girder.
Figure 2:
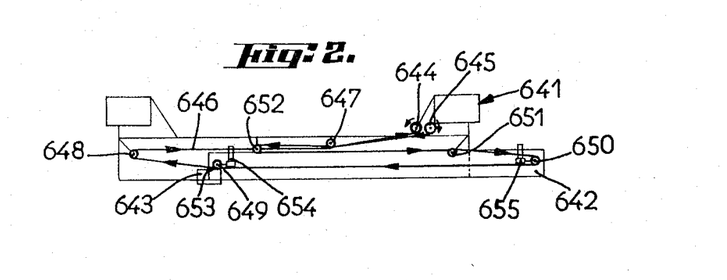
FIGURE 2 is a diagram similar to FIGURE 1 showing the telescopic girder during its outward movement of translation.

Each aforesaid clamping member 654 constitutes a kind of clip so mounted as to be capable of pivoting substantially transverely to the axis of the traction rope 646 by being for example pivoted or rotatably mounted on a substantially horizontal axis substantially parallel to the longitudinal direction of the telescopic girder 642 and mounted on the girder end which corresponds to the left-hand end as seen in FIGURES 1 to 3 of the drawings. Each clip such as 654 comprises two jaws of which at least one is so pivoted as to be movable in relation to the other. Each clip comprises preferably hand-operated control means for clamping or releasing the aforesaid jaws, for example of the type consisting of a clamping screw engaging a corresponding nut rigid with one of the jaws and adapted to be actuated by means of a handwheel, cranked lever or handle.

The winch with its built-in reduction gearing, the aforesaid pair of drums and the driving electromotor is equipped with at least one safety two-way limit switch of which the two positions corresponding respectively to the end of the winding and to the end of the unwinding on each drum.

This system controlling in combination the movement of translation of the telescopic girder and of the trolley operates as follows, the successive steps comprising an outward movement of the telescopic girder as shown in FIGURES 1 to 3, and a movement of the hoisting trolley, the inward movements of the telescopic girder taking place in the reverse order. Assuming that in the initial or starting condition in the telescopic girder is fully retracted inside the gantry structure and that the hoisting trolley is in its intermediate position, as shown in FIGURE 1, the operator causes the rope-clamping clip 654 (of which the jaws are assummed to be open) to tilt to a position in which it can clamp the hope 646, of fibre, metal or any other suitable cable material, and then closes the jaws by rotating the aforesaid handwheel in order to fasten the telescopic girder 642 with the rope 646 by means of said clip 654. Then the gantry operator actuates the hand or remote control available on the winch for engaging the left-hand drum 644 and simultaneously disengaging the right-hand drum 645, this double and simultaneous clutch engagement and disengagement being obtained for example by moving a single control member such as a control level or handle to a suitable position. Thus, the two drums are caused to revolve in opposite directions as shown by the arrows in FIGURES 2 and 3; in other words, in the specific example illustrated, the left-hand drum 644 revolves in the counter-clockwise direction and the right hand drum 645 revolves in the clockwise direction, the velocities of rotation of the two drum being numerically equal. The various rope runs, spans, ends or sections 646 extending between two adjacent or successive return or guide sheaves will then move in the direction of the arrows as shown in FIGURES 2 and 3.

Under these conditions the telescopic girder 642 will be driven by the upper run of rope 646 travelling to the right as seen in the figures, and will therefore travel in the same direction so as to project gradually out from the right-hand end of the gantry 641, and at the same time the hoisting trolley 643 which was initially substantially intermediate the ends of said gantry (see FIGURE 1) and is constantly connected to the lower run of rope 646, is moved to the left as seen in the figure. During this movement, the drum 644 will wind one end of rope 646 and the tractive effort thus exerted on the rope 646 will cause at the same time the unwinding of the other end of this rope from the right-hand drum 645 of which the movement of rotation is braked automatically by the brake harness equipping the winch.

When the telescopic girder 642 has attained its outermost position (which may be determined if desired by its engagement with a suitable stop member mounted on the gantry) the safety limit switch operates in the direction to de-energize the driving motor and thus stop the drums. Then the operator will stop or lock the telescopic girder in its outermost position by actuating a suitable locking device, and then he releases the clip 654 to free the rope 646, thus disconnecting the telescopic girder from said rope. In this maximum overhanging position of the telescopic girder the hoisting trolley 643 was moved in a direction opposite to that of said telescopic girder and is now positioned near the left-hand end of the main gantry frame structure, that is, opposite said projecting telescopic girder.

To effect the movements of translation of the hoisting trolley with the two clips 654 and 655 released and inoperative, the operator simultaneously engages both drums 644, 645 by means of the control mechanism provided on the winch 661. By starting the winch-driving electromotor in either direction the corresponding movement of the rope 646 will be obtained, thus causing the hoisting trolley 643 to move in one or the other direction, from the left-hand end of the main gantry frame structure to the right-hand end of the overhanging telescopic girder, without driving this girder since it has been disconnected beforehand from the rope.

It is clear that the operations are exactly the same when the telescopic girder is moved to its opposite outward position, that is, to the left as seen in the figure. In this case, the rope clip 655 located at the right-hand end of the telescopic girder is used for fastening the girder to the traction rope.

Now to obtain the reverse or inward movement of the telescopic girder back into the gantry, the operator will firstly move the trolley back to the gantry end opposite to the one from which the telescopic girder projects, that is to the extreme left end position as seen in FIGURE 3. Then he places the rope clamping device or clip 654 on rope 646 and closes the jaws of this clip in order to restore the operative connection between the telescopic girder 642 and the traction rope 646. In this respect it may be noted that it is advantageous to constantly use the same rope-clamping clip which is on the gantry side in the overhanging position of the telescopic girder for moving the girder out or in on one side, for if the other rope-clamping clip such as 655 which lies at the opposite, right-hand and projecting end of the telescopic girder were used, the operator would have to make his way along a very difficult and relatively dangerous path on the overhanging girder portion. Alternatively remote control means may be provided for operating the clips from a control cab.

Of course, the rope-clamping clips 654 and 655 may be used in either directions of translation.

With the rope clip 654 locked in its rope-clamping position (the other clip 655 being open or released) the operator keeps the two drums 644 and 645 engaged but simultaneously reverses the direction of rotation, as shown by the arrows pointing in opposite direction with respect to those of FIGURES 2 and 3, whereby the left drum 644 will now revolve in the clockwise direction, i.e. in the direction to unwind the rope 646, whereas the right drum 645 revolves in the counter-clockwise direction to wind the rope 646, by pulling same. Under these conditions the rope movement takes place in the aforesaid direction which is the reverse of the one shown by the arrows in FIGURES 2 and 3, whereby the telescopic girder will move inwards from its overhanging position to its retracted position, from right to left, and simultaneously the trolley will travel in the opposite direction, from left to right.

When the girder is fully retracted and the trolley has resumed its central position on the gantry, the aforesaid safety limit switch will stop the movement of rope 646 and therefore the girder and trolley movements. Thus the telescopic girder may be locked in its retracted or home position.

FIGURES 4 and 5 illustrate diagrammatically the gantry with the reeving contemplated for the hoisting hook which is shown separately in order to simplify the drawing, the gantry runways and posts having also been omitted on purpose. This hoisting trolley reeving system comprises at least one power-driven trolley (not shown) mounted in a fixed position on the main frame structure 641 of the gantry and provided in turn with at least one winding drum 664 of the reversible rotation type, on which the end of at least one hoisting rope 665 is adapted to be wound, the other end of this rope being attached to a fixed point 666 of said main frame structure 641 so as to form a loop passing in succession, from the drum 664, over at least two approximately superposed return sheaves 667, 668 carried by the main frame structure 641 at one end thereof, over a guide sheave 669 mounted on the corresponding or adjacent end of the telescopic girder 642, over a first guide sheave 670 mounted on the hoisting trolley 643, over the weighted tackle-block pulley 671, over another return sheave 672 carried by the hoisting trolley, over another guide sheave 673 carried by the opposite end of the telescopic girder, and finally in succession over two substantially superposed return sheaves 674, 675 mounted near the other end of the main frame structure of the gantry. The reference numerals 676, 677 designate diagrammatically the carrier rollers or wheels of the hoisting trolley 643.

The return sheaves carried by the main frame structure of the gantry, the telescopic girder and the hoisting trolley are preferably so mounted that the various runs or spans of the hoisting rope 665 extend substantially horizontally or vertically in order to ensure a more efficient transmission of the efforts. To this end, the two lower sheaves 668 and 674 carried each by one end of the main frame structure of the gantry are advantageously mounted in pivoting strap supports constituting for example cranked levers so as to be retracted automatically by the passage and the thrust of the moving telescopic girder. Sheaves 668 and 674 are carried respectively by one arm of each cranked lever and the other arm is adapted to engage a stop member carried by the frame 641 and corresponding to the operative tilted position of said sheaves.

FIGURE 4 illustrates these two sheaves in their operative position in which they engage the hoisting rope 665, and FIGURE 5 shows the telescopic girder in its overhanging position on the right, with the tright-hand sheave 674 pushed upwards by the telescopic girder so as to lie substantially outside the path thereof and to discontinue its co-operation with the hoisting rope 665 from which it is released. When the telescopic girder is retracted home into the gantry, the sheave 674 is urged thereagainst by gravity and also by the pressure of the hoisting rope 665, whereby it will fall back to its operative position described hereinabove and defined by said stop member.

The operation of this hoisting control system will be readily apparent to anybody conversant with the art. The rotation of drum 664, for example in the clockwise direction, will unwind the rope 665 and therefore lower the weighted hoisting hook 671, whereas the rotation of said drum in the opposite or counter-clockwise direction will cause the hoisting hook to move upwards. When the telescopic girder performs an outward or inward movement of translation, while the trolley 664 is stationary, the height or vertical position of the hoisting hook 671 varies concomitantly with the relative position of the telescopic girder, the hook being lowered as the girder moves inwards and being raised as the girder moves outwards. In order to maintain the hoisting hook 671 in a fixed vertical position during the movement of translation of the telescopic girder, a preferably automatic mechanism is provided for synchronizing the respective movements of the telescopic girder and hoisting rope.

Figure 6:
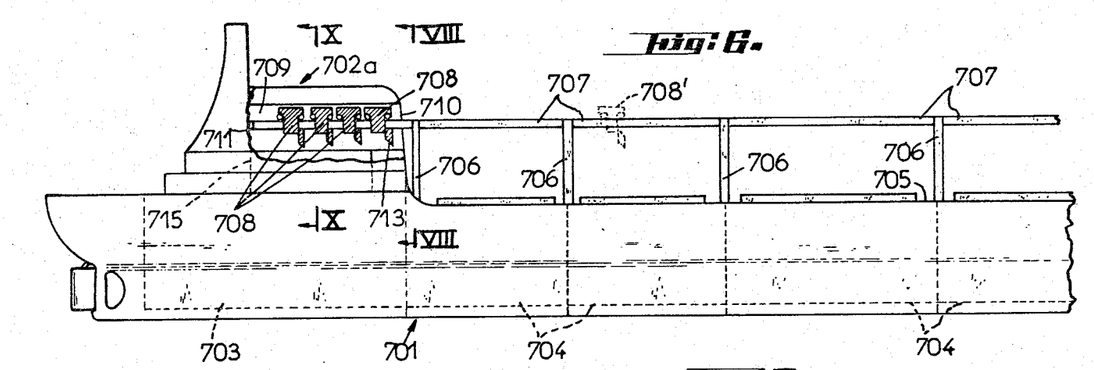
FIGURE 6 is a fragmentary side elevational view showing a ship provided with a rear castle equipped with a loading and unloading machinery according to this invention, the side wall of the castle being broken away to show the gantry shelter therein.

In the specific form of embodiment illustrated in FIGURE 6 the reference numeral 701 designates a ship equipped with a rear superstructure or castle 702 overlying substantially the engine room 703. This vessel comprises a series of separate holds such as 704 to which access can be had through corresponding hatchways provided in the weather deck 705 of the ship. Masts or posts 706 disposed by pairs and emerging from the weather deck on either side thereof carry continuous longitudinal runways 707 extending throughout the useful length of said weather deck and on these runways a plurality of gantries 708, for example four in number in the example illustrated, are adapted to roll.

The rear castle 702 comprises a house or compartment 709 for sheltering the series of gantries stowed close to each other. To this end, this compartment 709 has a corresponding aperture 710 on its front face towards the weather deck 705 and is equipped on both sides with a pair of internal longitudinal runways 711 constituting the direct extensions of the external runways 707 so that the gantries 708 may roll directly into their shelter 709.

Figure 8:
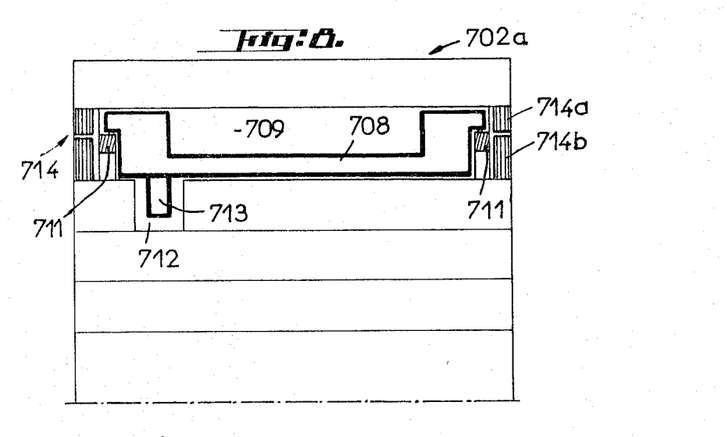
FIGURE 8 is a cross-sectional view taken upon the line VIII—VIII of FIGURE 6, showing the open end face of the shelter-forming compartment.

This shelter 709 comprises advantageously a transverse aperture having a configuration corresponding to the vertical outline or gauge of said gantries 708 (see FIGURE 8). To this end, the height of the 'tweendeck space constituting the compartment 709 will be about 13 feet (4 meters) and this space will advantageously comprise at a suitable location a longitudinal cavity 712 of a depth of about 6½ feet (2 meters) constituting a kind of pit for receiving the control cabs 713 of the gantries.

Figure 7:
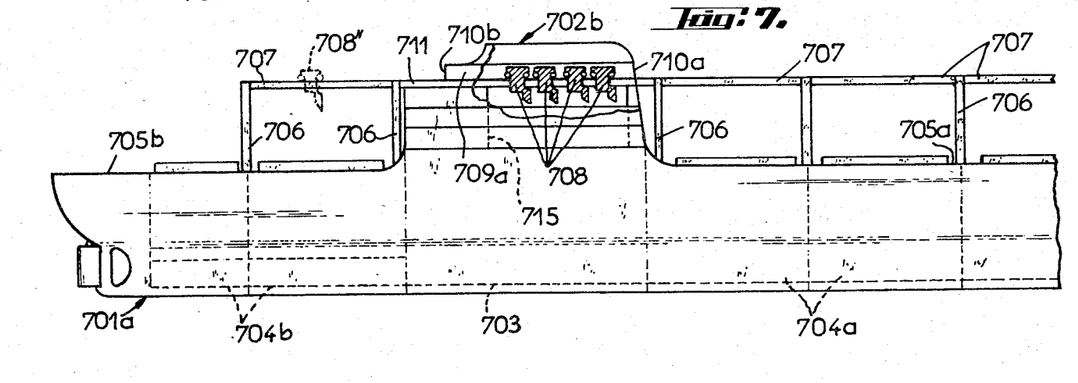
FIGURE 7 is a similar view showing a vessel with a central castle, equipped with the loading and unloading appliance of this invention, the side wall of the castle being likewise broken away to show the gantry shelter therein.

FIGURE 7 illustrates the application of the device of this invention to a vessel 701a provided with a central or intermediate castle 702b and comprising under these conditions two weather decks, a fore deck 705a and a rear deck 705b from which access can be had to the fore and aft holds 704a and 704b respectively. The rear weather deck 705b is also equipped with elevated runways 707 carried by masts or posts 706. The shelter-forming compartment 709a extends in this case throughout the length of the castle 702b and is open at both ends, respectively fore 710a and aft 710b, so that the internal runways 711 extend throughout this compartment to interconnect the fore-and-aft external runways 707.

Figure 9:
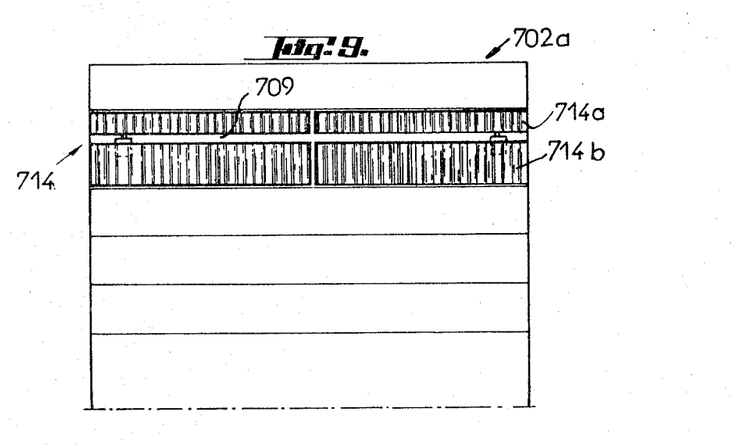
FIGURE 9 is a view similar to FIGURE 8, showing the end face of the shelter-forming compartment closed by curtains.

In either case each front or rear transverse aperture may be closed by a movable device such as a curtain 714 as shown in FIGURE 9. These curtains may for example of the flexible corrugated sheet type guided in slideways or suspended by means of rollers on rails and adapted to be wound on a drum. For the sake of convenience, the arrangement may comprise an upper curtain 714a and a lower curtain 714b consisting each of two half-curtains movable horizontally athwartship and adapted to be wound on vertical drums and to be joined together centrally of the front aperture or to be moved apart to their open position on either side of said aperture.

Figure 10:
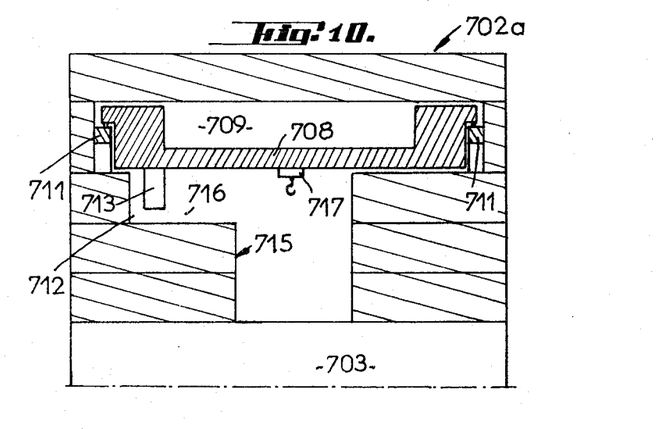
FIGURE 10 is a cross-section taken upon the line X—X of FIGURE 6.

In either case, that is, whether the vessel is equipped with a rear castle or with a central castle, it is advantageous that the upper portion of the casing 715 of the engine room 703 projects somewhat into the shelter-forming compartment 709 or 709a so that the hoisting equipment of the gantries may penetrate through said casing into the engine room. This communication is illustrated in FIGURE 10. The casing 715 communicates through a passage or lobby 716 with the pit 712 to permit the movements of translation of the hoisting trolley 717 with the machine part or engine suspended from the hoisting hook in the direction of said pit, so that this part or engine may be transferred to the outside during the movement of the corresponding gantry 708.

In FIGURES 6 and 7 the gantries are shown in thick lines in their shelter position inside the compartment 709 or 709a. The broken lines 708' of FIGURE 6 show a gantry in its operative position above a fore hold, and FIGURE 7 shows also in broken lines at 708" another gantry in its operative position above an aft hold.

Of course, this invention should not be construed as being limited by the specific forms of embodiment described and illustrated herein which are given by way of example only and to which many modifications and variations may be brought without departing from the scope of the invention as set forth in the appended claims.

What I claim is:

1. A travelling crane comprising a rolling main frame spanning and movable on tracks, a telescoping rolling boom of substantially the same length as said main frame and mounted in the latter longitudinally thereof for motion therealong, said boom being reciprocally movable from a retracted position inside of said main frame to an outside extended overhanging position wherein it projects at least in part from either end of said main frame, a hoisting trolley truck carried by said crane and continuously movable along the full length of either of said main frame and said boom frame from the free outward projecting end of said boom in its outward reaching position to the opposite remote end of said main frame, thus being indifferently supportable from either of said main frame and telescoping boom, at least two powered reversible rotatable drums for shifting either of said boom and said trolley truck and mounted on and transversely of said main frame in substantially parallel relationship, drive means operatively connected to said drums which are selectively disconnectable separately from said drive means to revolve in opposite directions, at least one pair of first end sheaves provided at the opposite ends, respectively, of said main frame, at least one pair of second end sheaves provided at the opposite ends, respectively, of said telescoping boom, at least one tractive driving rope fastened intermediate of its length to said trolley truck so as to form two runs each of which starting from said trolley truck in opposite directions makes a loop reeved successively around one first sheave and one second sheave at the corresponding ends of said main frame and of said boom respectively, the free ends of said runs being wound on said boom-shifting drums respectively, whereby one run may be wound on one drum while being simultaneously payed out from the other drum, and releasable attachment means provided on said boom to rigidly connect and disconnect the latter selectively to and from said runs, respectively.

2. A device according to claim 1 wherein said attachment means consist of a pair of clamping dog members fitted with movable jaws and provided at both opposite ends of said telescoping boom respectively.

3. A device according to claim 1, comprising at least one motor driven hoisting winch mounted on said main frame and having at least one reversibly rotatable hoisting drum, at least one pair of first end pulleys provided at the opposite ends of said main frame respectively, at least one pair of second end pulleys provided at the opposite ends of said telescoping boom respectively, at least one pair of guide pulleys carried by said trolley truck, a pendent tackle block provided on said trolley truck with a depending load engaging and lifting means, and at least one hoisting rope having one end wound on said hoisting drum and forming a loop successively passing around one first and one second end pulleys at one end of said main frame and telepscoping boom, respectively, one guide-pulley on said trolley truck, said tackle block, the other guide pulley on said trolley truck, one second and one first end pulleys at the other end of said telescoping boom and main frame, respectively, having one end wound on said hoisting drum whereas the other end of said rope is made fast at a fixed point of said main frame.

4. A device according to claim 3 wherein said main frame is provided with at least one pair of additional end pulleys mounted at its opposite ends respectively below said pair of first end pulleys and supported in rocking pulley-shells respectively pivoted to said main frame so as to be retractable upon outward displacement of said telescoping boom.

5. A device according to claim 1, wherein both of said drums are located near one end of said main frame, said main frame carrying in addition at least one return sheave and at least one guide sheave over which are reeved said runs, respectively, said return and guide sheaves being mounted intermediate the ends of said main frame in such a manner that said guide sheave is located between said return sheave and said drums so that the run coming from that end of main frame which is opposite to and remote from said drums passes below said guide sheave in engaging relationship therewith towards one drum whereas the other run, coming from the opposite end of said main frame, is reeved around said return sheave which returns said run to the other drum.

6. A device according to claim 3, wherein there are two of said hoisting drums and both of said drums are located near one end of said main frame, said main frame carrying in addition at least one return sheave and at least one guide sheave over which are reeved said runs, respectively, said return and guide sheaves being mounted intermediate the ends of said main frame in such a manner that said guide sheave is located between said return sheave and said drums so that the run coming from that end of main frame which is opposite to and remote from said drums passes below said guide sheave in engaging relationship therewith towards one drum whereas the other run, coming from the opposite end of said main frame, is reeved around said return sheave which returns said run to the other drum.

References Cited by the Examiner

UNITED STATES PATENTS

| | | | |
|---|---|---|---|
| 2,456,104 | 12/1948 | Andersen | 214—15 |
| 2,893,574 | 7/1959 | Bartenfeld | 214—15 |
| 2,951,599 | 9/1960 | Bogar | 214—16 |
| 3,083,838 | 4/1963 | Bevard | 212—74 |

GERALD M. FORLENZA, *Primary Examiner.*

ROBERT G. SHERIDAN, *Examiner.*

UNITED STATES PATENT OFFICE
CERTIFICATE OF CORRECTION

Patent No. 3,317,058                                       May 2, 1967

Henri Kummerman

It is hereby certified that error appears in the above numbered patent requiring correction and that the said Letters Patent should read as corrected below.

Column 1, line 12, for "patricularly" read -- particularly -- column 4, line 34, for "646 at least" read -- 646 at at least - line 73, strike out "in"; column 5, line 4, for "hope" read -- rope --; column 7, line 15, for "tright" read -- right --; colu 8, line 13, after "may" insert -- be --; line 60, strike out "frame", second occurrence.

Signed and sealed this 2nd day of January 1968.

(SEAL)
Attest:

Edward M. Fletcher, Jr.                                  EDWARD J. BRENNER
Attesting Officer                                                Commissioner of Patents